US006837045B2

(12) United States Patent
Heusser

(10) Patent No.: US 6,837,045 B2
(45) Date of Patent: Jan. 4, 2005

(54) ELECTROHYDRAULIC LIFTING CONTROL DEVICE FOR INDUSTRIAL TRUCKS

(75) Inventor: Martin Heusser, Munich (DE)

(73) Assignee: Hawe Hydraulik GmbH & Co. KG, Munich (DE)

( * ) Notice: Subject to any disclaimer, the term of this patent is extended or adjusted under 35 U.S.C. 154(b) by 53 days.

(21) Appl. No.: 10/448,666

(22) Filed: May 30, 2003

(65) Prior Publication Data

US 2003/0221548 A1 Dec. 4, 2003

(30) Foreign Application Priority Data

Jun. 3, 2002 (DE) .................................... 202 08 577 U

(51) Int. Cl.[7] ................................................ F16D 31/02
(52) U.S. Cl. ............................. 60/403; 91/446; 91/454
(58) Field of Search ..................... 60/403, 468; 91/446, 91/454

(56) References Cited

U.S. PATENT DOCUMENTS

| | | | | | |
|---|---|---|---|---|---|
| 4,065,922 | A | * | 1/1978 | Ott et al. | 60/468 |
| 4,401,009 | A | * | 8/1983 | Zeuner et al. | 91/454 |
| 4,409,887 | A | * | 10/1983 | Shingu et al. | 91/446 |
| 4,835,966 | A | * | 6/1989 | Kauss et al. | 60/468 |
| 5,313,873 | A | * | 5/1994 | Gall et al. | 91/454 |
| 5,355,773 | A | * | 10/1994 | Winkels | 91/454 |
| 5,522,479 | A | * | 6/1996 | Jo | 91/454 |
| 5,701,618 | A | | 12/1997 | Brugger | |
| 6,065,386 | A | * | 5/2000 | Rub et al. | 91/446 |

FOREIGN PATENT DOCUMENTS

| | | | |
|---|---|---|---|
| DE | 41 40 408 | A1 | 6/1993 |
| DE | 42 39 321 | A1 | 5/1994 |
| DE | 100 10 670 | A1 | 9/2001 |
| EP | 0 546 300 | A1 | 6/1993 |
| EP | 0 893 607 | A1 | 1/1999 |

* cited by examiner

*Primary Examiner*—Edward K. Look
*Assistant Examiner*—Michael Leslie
(74) *Attorney, Agent, or Firm*—Cook, Alex, McFarron, Manzo, Cummings & Mehler, Ltd.

(57) ABSTRACT

In an electrohydraulic lifting control device (S) for stacker trucks, which comprises, for lifting control, an electrically operable three-way flow regulator (R1) in a lifting branch (1) between a pressure source (P) and a hydraulic cylinder (Z) as well as, for lowering control, an electrically operable two-way flow regulator (R2) in a lowering branch (2) which branches off from the lifting branch (1) and leads to the reservoir, a redundancy switching element (A) is provided, which is actively electrically operable between closed and open positions, said redundancy switching element (A) being provided between the control pressure circuit of the two-way flow regulator (R2) and/or the control pressure circuit of the three-way flow regulator (R1) and the reservoir (T).

14 Claims, 3 Drawing Sheets

ELECTROHYDRAULIC LIFTING CONTROL DEVICE FOR INDUSTRIAL TRUCKS

Figure 1:
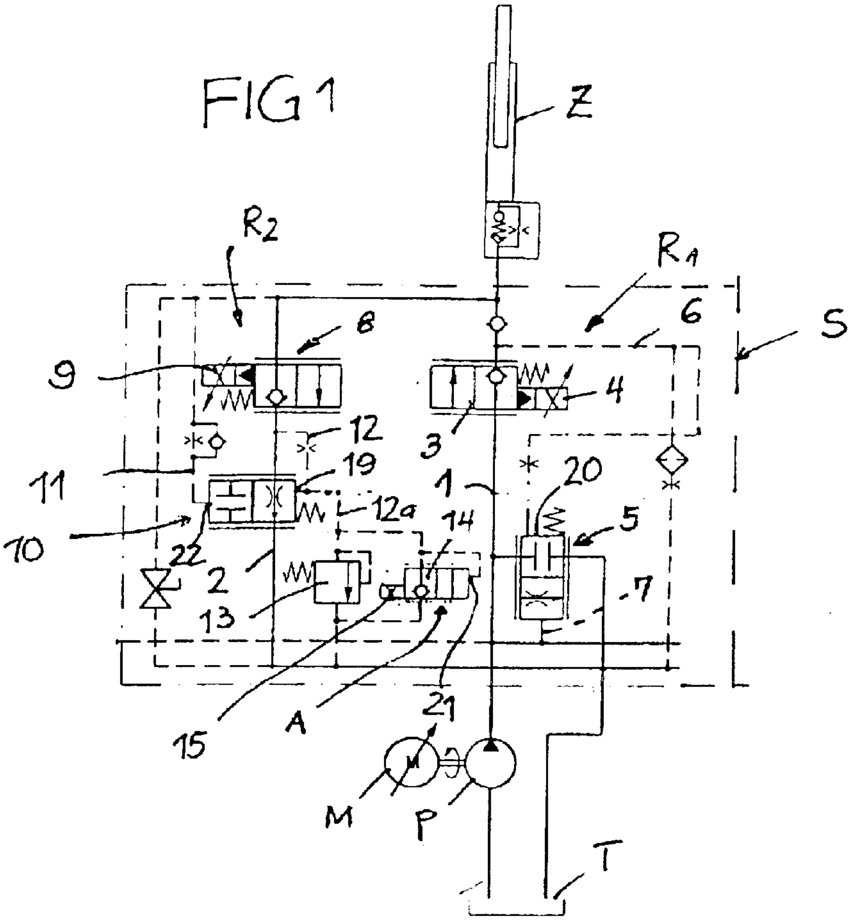

The present invention relates to an electrohydraulic lifting control device of the type referred to in the generic clause of claim 1.

In the electrohydraulic lifting control device known from DE 42 39 321 C only the proportional pressure control valves for lifting control and lowering control are provided as electrically operable components. Safety requirements are very high for industrial trucks, and in particular for stacker trucks. Dirt in the hydraulic medium, e.g. chips, shavings or the like, cannot be avoided with absolute certainty. Such contamination may have the effect that e.g. the proportional pressure control valve of the lowering control or of the lifting control gets stuck and can no longer be adjusted so that the load carried by the hydraulic cylinder will move downward in an uncontrolled manner or an aftertravel effect will occur. The proportional magnet produces a force which will then not suffice to overcome the increased kinetic resistance in the valve. This means that an increased safety risk will exist, which did not exist in the case of former mechanically actuated hydraulic lifting control devices, since in these devices it was possible to overcome such a resistance simply by increasing the mechanical force in a suitable way.

In the electrically controllable lifting unit known from DE 100 10 670 A (FIG. 1) the three-way flow regulator in the lowering branch is connected to the reservoir at the discharge side and it is connected to the suction side of the pump for recovering energy. Since the speed of the hydraulic cylinder is controlled via the speed of the pump, only a black-and-white 2/2-way solenoid valve is provided in the lifting branch. A discharge line with a 2/2-way solenoid switching valve branches off from the lifting branch, said 2/2-way solenoid switching valve being electrically switched open during recovery lowering, if no additional consumer has to be supplied. If the three-way flow regulator should get stuck due to contamination during lowering, the lifting cylinder will be retracted in an uncontrolled manner.

In the lifting control device known from DE 41 40 408 A, two proportional pressure control valves are provided for lifting control and lowering control. If the proportional pressure control valve should get stuck due to contamination during lowering, the lifting cylinder will be retracted under load in an uncontrolled manner.

Additional prior art is contained in EP 0 546 300 A, EP 0 893 607 A, U.S. Pat. No. 5,701,618 A.

In electrically controlled stacker trucks there is a trend towards increased safety, irrespectively of whether these trucks are driven by an engine or electrically driven, insofar as additional electrically operable safety means are provided, which become effective if an electrically controlled control unit of at least the lifting cylinder should fail and which serve to prevent the load from dropping so as to protect e.g. persons. Secondary consumers supplied by the same pressure source often operate with a pressure which is lower than that of the main lifting cylinder. It is true that these demands can be fulfilled by electrically operable valves positioned at various points in the control device, but this necessitates an additional expenditure with respect to valves and operating magnets or expensive proportional magnets with complicated cabling.

It is the object of the present invention to provide an electrohydraulic lifting control device of this kind having, on the basis of a minimum expenditure, an increased operational reliability with respect to malfunctions caused by contamination of the hydraulic medium or by gradually arising mechanical defects of hydraulic switching elements.

Secondary aspects within the framework of the above object are that an additionally activatable decelerating function should be possible during lowering control without additional expenditure, or that an intentional active overruling of one or of both flow regulators is desirable, or that it is desired that the supply pressure for at least one additional hydroconsumer should be adjustable, in a simple manner and with minimum expenditure, to a value which is lower than the supply pressure for e.g. the lifting control. The above-mentioned expenditure concerns mainly the use of magnets as valve actuators.

According to the present invention, the above object is achieved by the features of claim 1.

The operational reliability of the electrohydraulic lifting control device is increased because the redundancy switching element will intervene actively if at least one other electrically operable switching element should no longer operate properly. By means of the active intervention of the redundancy switching element, primarily uncontrolled movements of the load and undesired lowering of the load will be avoided. If e.g. the proportional pressure control valve should get stuck during lowering control or during lifting control so that it can no longer be adjusted by means of its proportional magnet (the hydraulic cylinder would then either retract under the load or extend against the load), the then effective redundancy switching element will, in the open position, either move the pressure balance of the two-way flow regulator to the load-holding shut-off position (bringing the downward-moving hydraulic lifting cylinder to a halt) or move the pressure balance of the three-way flow regulator to the open position (draining the flow to the reservoir so that the hydraulic lifting cylinder will come to a halt). If the proportional pressure control valve functions properly, the redundancy switching element will not intervene in the respective pilot circuit, since it will have current supplied thereto when the respective proportional magnet has current applied thereto and will maintain its closed position. The redundancy switching element is a safety component which is easy to integrate and which necessitates only a minimum expenditure. For this function, only the magnet of the switching element is necessary for the control electronics and, from the hydraulic point of view, a simple, small-sized valve for the pilot oil will suffice.

Thanks to its arrangement, the redundancy switching element offers, however, additional advantageous possibilities in connection with which it must be assumed that the electronic control unit provided in the case of modern industrial trucks comprises a microprocessor which offers many possibilities for individual program routines or functions. By displacing the redundancy switching element to its open position during lowering control, an additional individual deceleration of the lowering movement is e.g. possible by moving the pressure balance of the two-way flow regulator to the closed position in a way other than by the pressure difference of the proportional pressure control valve. A similar individual deceleration could also be effected via the pressure balance of the three-way flow regulator during lifting control. In addition, the redundancy switching element is able to actively overrule the two-way flow regulator or the three-way flow regulator, i.e. it is able to move the respective pressure balance to the closed position and the fully open position, respectively. Finally, the redundancy switching element can act as a variable pressure limiting valve and vary the pilot pressure of the pressure balance of the three-way flow regulator, said pressure balance adjusting the supply pressure for at least one additional hydroconsumer which is lower than the supply pressure of the lifting hydraulic cylinder. The redundancy switching element in cooperation with the control electronics offers possibilities for a more universal control of the industrial truck, the already existing efficiency of the superordinate electronics being utilized without any additional expenditure being necessary.

The redundancy switching element should be arranged between the reservoir and either the opening pilot side of the pressure balance of the two-way flow regulator and/or the closing pilot side of the pressure balance of the three-way flow regulator. At this position, the redundancy switching element, when actively actuated, relieves the pilot pressure for the respective pressure balance so that this pressure balance will inevitably move to its closed position or open position.

In order to be able to adjust a sensitive control of the pressure relief by means of the redundancy switching element, it will be expedient to implement said redundancy switching element as a 2/2-way control valve with pilot pressure control in the opening direction and with a proportional magnet as an actuator for adjustment in the closing direction. This implementation will be advantageous when the redundancy switching element acts as a variable pressure limiting valve and has to adjust the pilot pressure individually. For the desired safety aspect, it will, however, suffice when the redundancy switching element can only be adjusted between an open position and a closed position (black/white function).

For this reason, a 2/2-way control valve with pilot pressure control in the opening direction and with a black-and-white magnet as an actuator for adjustment in the closing direction will suffice as a redundancy switching element, if increased safety requirements alone have to be satisfied. A 2/2-way valve having this kind of structural design is moderate in price and functionally reliable. It will be expedient when the redundancy switching element is here a seat valve characterized by a leakage-free closed position.

According to an expedient embodiment, the pilot pressure control of the redundancy switching element, by means of which said redundancy switching element is moved to its open position, is connected to the opening pilot side of the pressure balance of the two-way flow regulator or the closing pilot side of the pressure balance of the three-way flow regulator. As long as a pilot pressure is applied to the respective pressure balance, the redundancy switching element will therefore be loaded in the direction of its open position, but it will only be able to assume this open position if it has not been actively electrically moved to its closed position.

The operational reliability can be increased still further, when the redundancy switching element is associated with both flow regulators and fulfills its function for the respective flow regulator in dependence upon the pressure, i.e. the change-over valve connects the instantaneously operating pressure balance to the redundancy switching element, which will have the effect that the selected pilot pressure or the higher pilot pressure will be applied. It follows that the redundancy switching element will automatically cooperate with the three-way flow regulator during lifting control, whereas during lowering control it will automatically cooperate with the two-way flow regulator.

According to an expedient embodiment, the redundancy switching element can be arranged parallel to a control-pressure pressure limiting valve. This offers structural advantages, since a pilot pressure channel extends via the pressure limiting valve to the reservoir or the return line anyhow. When the redundancy switching element is implemented as a pressure control valve, which is adapted to be operated by a proportional magnet and which takes over the function of a pressure limiting valve when it has applied thereto varying currents, the pressure limiting valve may be dispensed with.

Guided by the control electronics, the redundancy switching element will be able to fulfil the function of an electrically adjustable pressure limiting valve when, as has already been mentioned, it is implemented as a proportional pressure control valve, so that the pressure balance of the three-way flow regulator will adjust a lower supply pressure for additional hydroconsumers. All the above-mentioned functions can be achieved with a small valve and a magnet.

Since in the case of a malfunction of e.g. the three-way flow regulator during lowering control, the redundancy switching element arranged in the pilot circuit will move to its open position as soon as the proportional magnet of the three-way flow regulator is currentless, the lifting hydraulic cylinder may aftertravel very slowly via the pilot circuit in spite of the load-holding function of the pressure balance. For this reason, it will be expedient to implement the redundancy switching element as a 4/2-way switching valve with a switching magnet as an actuator and to shut off the pilot line to the lowering branch such that its leakproofness satisfies at least the requirements for industrial trucks, whereas the opening pilot side of the pressure balance is relieved directly to the reservoir. This results in a perfect load-holding function of the pressure balance so that the lifting hydraulic cylinder will reliably remain at a standstill even if the proportional pressure control valve has got stuck.

In order to be able to guarantee this high safety standard even if the redundancy switching element is intended to execute the pressure lowering function for additional consumers, it will be expedient to implement the redundancy switching element even as a 4/3-way proportional pressure control valve with a proportional magnet as an actuator and to connect the two pilot lines from the lowering branch and from the closing pilot side of the pressure balance of the two-way flow regulator separately. When the 4/3-way proportional pressure control valve is de-excited in the case of a discontinuance of the lowering control, it will assume its shut-off position at which the opening pilot side of the pressure balance of the two-way flow regulator will be relieved towards the reservoir and the pressure balance will be adjusted for holding the load. This switching position is also assumed, when the lifting control is discontinued. This has the effect that the closing pilot side of the pressure balance of the three-way flow regulator is relived towards the reservoir so that the pressure balance will be adjusted to the closed position, if supply pressure is applied. As soon as one of the proportional magnets of the flow regulators has current applied thereto for lifting control or for lowering control, also the proportional magnet of the 4/3-way proportional pressure control valve will have applied thereto maximum current. The resultant switching position switches open the pilot line from the lowering branch to the opening pilot side of the pressure balance of the two-way flow regulator and interrupts the connection of the pilot line to the closing pilot side of the pressure balance of the three-way flow regulator to the reservoir. If, however, an additional consumer is connected during lifting control, the proportional magnet of the 4/3-way proportional pressure control valve will have applied thereto a current value in accordance with the desired pressure reduction against the control spring and the pilot pressure; by means of this current value, a control function is executed for reducing the pilot pressure for the pressure balance of the three-way flow regulator. All these functions are achieved by a single valve and by means of only one proportional magnet.

According to an expedient embodiment, the 4/2-way switching valve or the 4/3-way proportional pressure control valve is implemented as a sliding valve whose leakproofness satisfies the requirements for industrial trucks. This means that the valve fulfills the requirement with regard to the leakproofness criterion for industrial trucks.

It will be expedient to provide in the sliding valve a valve slide member which is pressure-compensated with respect to the reservoir pressure so that it will suffice to use for the redundancy switching element a switching magnet or a proportional magnet which is as small as possible and weak and therefore inexpensive. If the redundancy switching element controls also the pressure limitation for the additional consumers, it will be particularly expedient when the pilot pressure, against which the proportional magnet operates, acts only on a small subarea of the valve slide member.

The electrohydraulic lifting control device having the above-described structural design can be used for stacker trucks provided with an internal combustion engine as well as for stacker trucks provided with an electric motor. In the case of stacker trucks driven by an electric motor, the lifting control device can be used with or without energy recovery (recovery lowering). For the recovery lowering operation, in the case of which the electric motor is driven via the pump as a generator, it is only necessary to connect the lowering branch upstream of the pressure balance of the two-way flow regulator via a recovery line to the suction side of the pump, and to arrange a check valve between the pump and the reservoir. If the load pressure is high and if no additional hydroconsumer are connected, the full amount (controlled by the pressure balance of the two-way flow regulator) can be conveyed through the pump. If an additional hydroconsumer is connected, the pressure balance of the two-way flow regulator will, during recovery lowering, adjust a current through the pump which corresponds to the instantaneous requirements. The redundancy switching element will not intervene in the case of proper functioning, but only if a malfunction occurs, and in certain cases in which the pressure has to be reduced for the additional consumers.

The electrically actively operable components of the lifting control device should be connected to an electronic control unit which comprises a microprocessor or a logic circuit and which carries out the various operating routines according to requirements, as selected or according to an automated scheme.

Figure 2:
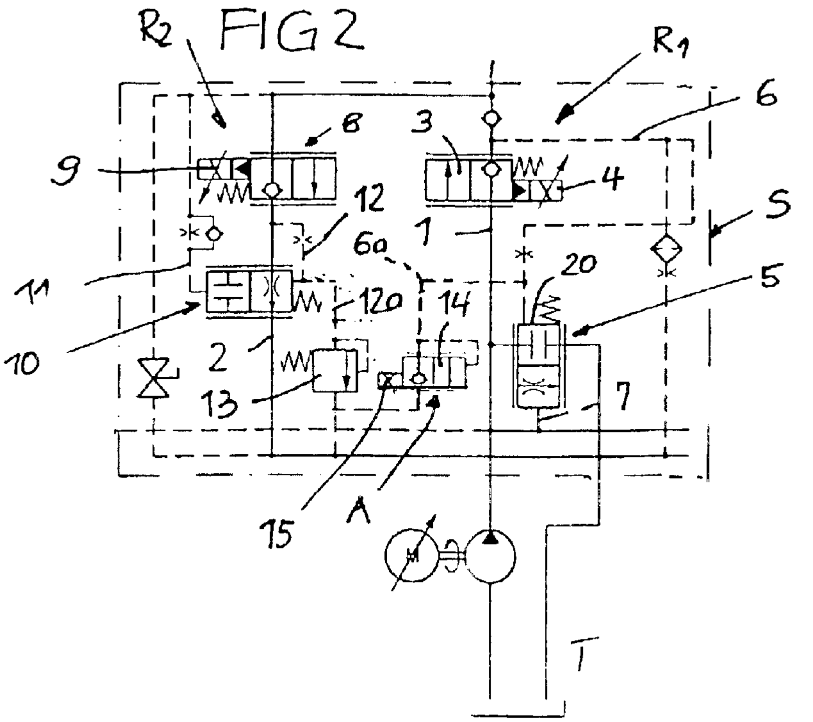
Figure 3:
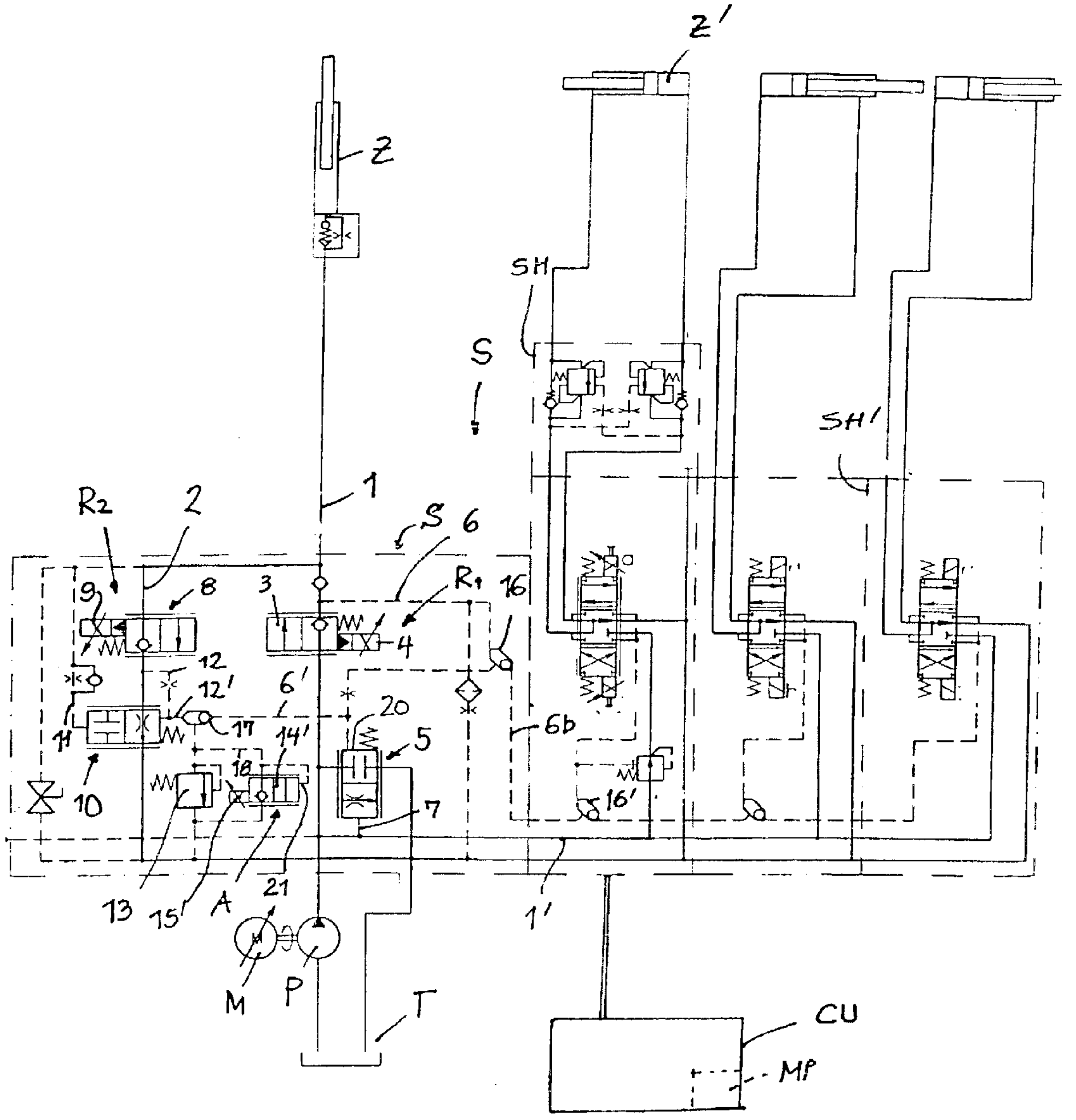
Figure 4:
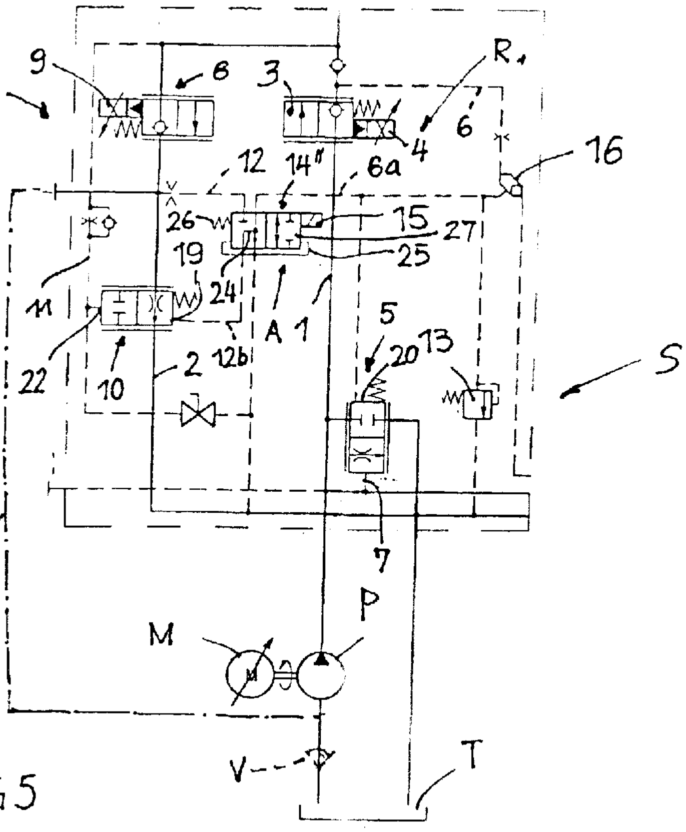
Figure 5:
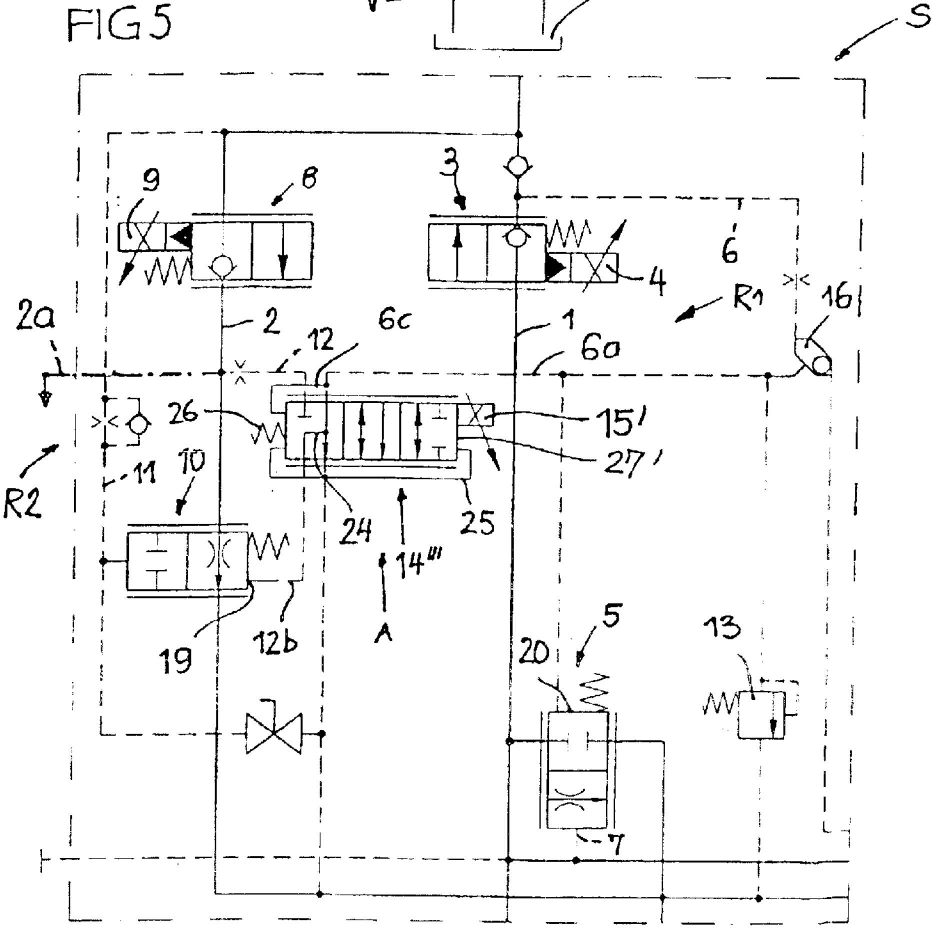

Embodiments of the subject matter of the present invention are explained making reference to the drawings, in which:

FIG. 1 shows a block diagram of an electrohydraulic lifting control device comprising a redundancy switching element, which is associated with the lowering control, FIG. 2 shows a block diagram of an electrohydraulic lifting control device comprising a redundancy switching element, which is associated with the lifting control, FIG. 3 shows a block diagram of an electrohydraulic lifting control device with additional hydroconsumers, comprising a redundancy switching element, which is associated with the lifting control and the lowering control and which, when associated with the lifting control, additionally serves as an electrically adjustable pressure limiting valve for reducing the pressure for the additional hydroconsumers, FIG. 4 shows a block diagram of another embodiment, and FIG. 5 shows a block diagram of still another embodiment.

In the electrohydraulic lifting control device S in FIG. 1 a hydraulic cylinder Z for lifting control is fed by a pressure source P (hydraulic pump), which is driven e.g. by an electric motor or a diesel engine M and which, if no additional hydroconsumers have to be fed, may remain deactivated during lowering control of the hydraulic cylinder Z, or (FIG. 4) which hydraulic pump may then operate as a motor for recovering energy. The hydraulic pump sucks hydraulic medium from a reservoir T and acts on a lifting branch 1 having provided therein a three-way flow regulator R1. The three-way flow regulator R1 consists of a proportional pressure control valve 3, by means of which the lifting speed is adjusted through a proportional magnet 4, and a pressure balance 5 between said lifting branch 1 and the reservoir T. The pressure control valve 3 is spring-loaded in the direction of the shut-off position. A pilot line 6 leading to the closing pilot side (which is also acted upon by a control spring) of the pressure balance 5 branches off from a point between the hydraulic cylinder Z and the pressure control valve 3. A further pilot line 7 branches off from the lifting branch 1 upstream of the pressure control valve 3 and leads to the opening pilot side of the pressure balance 5.

A lowering branch 2 leading to the reservoir branches off from the lifting branch 1 between the pressure control valve 3 and the hydraulic cylinder Z, said lowering branch 2 including a two-way flow regulator R2 for lowering control. The two-way flow regulator R2 consists of a pressure control valve 8, by means of which the lowering speed can be adjusted with the aid of a proportional magnet 9, and a pressure balance 10. The pressure control valve 8 is spring-loaded in the direction of the shut-off position, where it is able to keep the load pressure leakage-free. A pilot line 11 leading to the closing pilot side 22 of the pressure balance 10 branches off from the lowering branch 2 between the pressure balance 8 and the hydraulic cylinder Z, whereas a pilot line 12 branches off from the lowering branch 2 between the pressure balance 10 and the pressure control valve 8 and leads to the opening pilot side 19 of said pressure balance 10. The opening pilot side is also acted upon by a control spring. A pilot line 12*a* branches from the pilot line 12 and leads to the reservoir T, said pilot line 12*a* including e.g. a pressure-limiting valve 13.

The two-way flow regulator R2 has associated therewith an electrically operable redundancy switching element A, in addition to the two actively electrically operable components (proportional magnets 4, 9), said redundancy switching element A having current applied thereto when the proportional magnet 9 has current applied thereto. In the embodiment shown, this redundancy switching element A is a 2/2-way valve 14 which is constructed like a seat valve, i.e. with a leakage-free closed position, said 2/2-way valve 14 being adapted to be moved by a black-and-white magnet 15 to the closed position shown in the figure against the pressure branched off from the pilot pressure in the pilot line 12*a* at the opening pilot side 21 of said valve 14. The redundancy switching element A is arranged e.g. parallel to the pressure-limiting valve 13 in the line section of said valve 13.

Function:

Before the lowering control begins, the load pressure is held by the pressure control valve 8. Then, the proportional magnet 9 has current applied thereto, the strength of said current corresponding to the desired lowering speed. Simultaneously, the black-and-white magnet 15 has current applied thereto by a superordinate control unit, which is not shown, so that the redundancy switching element A will move to its shut-off position (as shown). In response to the application of current to the proportional magnet 9, the pressure control valve 8 causes pressure medium to flow off via an adjustable metering orifice, the pressure balance 10 keeping the pressure difference across the metering orifice and, consequently, the lowering speed constant. The pressure balance 10 is automatically adjusted to a position which depends on the pilot pressures in the pilot lines 11 and 12 and on its control spring (load independence).

If the pressure balance 10 should get stuck due to contamination or due to a mechanical defect when the lowering movement is discontinued, the pressure control valve 8 can be moved to its closed position by de-exciting the proportional magnet 9, so that the hydraulic cylinder Z will come to a standstill. The malfunction of the pressure balance 10 is therefore of no importance. If, however, the pressure control valve 8 itself should get stuck due to contamination or due to a mechanical defect and fail to move to the closed position in spite of the de-excitation of the proportional magnet 9, the hydraulic cylinder Z would continue its downward movement under the load because the pressure control valve 8 could no longer be actively acted upon by the proportional magnet 9 and because also the pressure balance 10 would remain open. In this case, the black-and-white magnet 15 of the redundancy switching element A is de-excited together with the proportional magnet 9 so that, due to the pilot pressure in the pilot line 12*a*, the redundancy switching element A will move abruptly to its open position and drain the pilot pressure to the reservoir. The pressure balance 10 is moved to its closed position by the pilot pressure in the pilot line 11 and holds the load pressure. The hydraulic cylinder Z comes to a standstill. If the pressure balance 10 gets stuck, it would also be possible to energize and de-energize the redundancy switching element A once or several times so as to reestablish the operability of said pressure balance 10.

In the electrohydraulic lifting control device S in FIG. 2, the redundancy switching element A is associated with the three-way flow regulator R1 for lifting control, i.e. the redundancy switching element A is included in a pilot line 6*a*, which leads to the reservoir and which branches off from the pilot line 6 leading to the closing pilot side 20 of the pressure balance 5, and offers a possibility of actively intervening in the case of malfunction. If, for example, the pressure balance 5 should get stuck at a middle position due to a malfunction, a further extension of the hydraulic cylinder Z could be prevented by moving the pressure control valve 3 to its closed position by means of the proportional magnet 4. If it should, however, happen that the pressure control valve 3 gets stuck, the hydraulic cylinder Z could, if at all, only be brought gradually to a standstill by switching off the motor/engine M; this could, however, not be guaranteed, if also other hydroconsumers had to be fed by the pressure source. In this case, the 2/2-way valve 14 is, in a condition in which both the proportional magnet 4 and the black-and-white magnet 15 are de-excited, rapidly moved to its open position by the pilot pressure in the pilot line 6, 6*a*, so that the pilot pressure will abruptly be drained towards the reservoir and the pressure balance 5 will be moved to the fully open position via the pilot line 7 by means of the pressure prevailing in the lifting branch 1; in this fully open position, the pressure medium is drained from the lifting branch 1 to the reservoir and the hydraulic cylinder Z is brought to a standstill. If the redundancy switching element A is energized and de-energized several times, it may be used for reestablishing the operability of a pressure balance 5 which got stuck.

In FIG. 3 the hydraulic lifting control device S is combined with additional control means SH, SH' for further hydroconsumers of the industrial truck, which are fed from the common pressure source P. The control means SH serves e.g. to operate a further hydroconsumer Z', e.g. a tilt cylinder or a gripper cylinder, which needs a lower supply pressure than the hydraulic cylinder Z. The additional hydroconsumer Z' is supplied by a pressure line 1', which branches off from the lifting branch 1 upstream of the pressure control valve 3 of the three-way flow regulator R1. In order to obtain a load-independent mode of operation also in the control means SH, the load pressure is applied via a pilot line 6*b* to the pilot line 6 and then to the closing pilot side 20 of the pressure balance 5, said pressure application being effected via change-over valve 16 which transmits the respective higher control pressure to the closing pilot side 20 of the pressure balance 5. The pressure balance 5 regulates the respective pressure required.

In this embodiment, the redundancy switching element A is functionally associated with the two-way flow regulator R2 and the three-way flow regulator R1, alternately, via a changeover valve 17 (or, as shown in FIGS. 4 and 5 via two separate pilot lines). A pilot line 12' branches off from the pilot line 12 of the two-way flow regulator R2 and leads to the changeover valve 17. A pilot line 6' leads to the other side of the change-over valve 17, said pilot line 6' branching off from the pilot line 6 of the three-way flow regulator R1. The respective higher pilot pressure is transmitted into the pilot line 18, which may have arranged therein the pressure-limiting valve 13 and the redundancy switching element A.

The redundancy switching element A of FIG. 3 is a 2/2-way proportional pressure control valve 14' which is acted upon by the pilot pressure in the pilot line 18 in the opening direction at its opening pilot side 21 and which, by means of a proportional magnet 15', can be displaced in the direction of the closed position shown in the figure.

The application of current to the proportional magnet 15' takes place simultaneously with the application of current to the proportional magnet 4 during lifting control, whereas it takes place simultaneously with the application of current to the proportional magnet 9 during lowering control. The proportional magnet 15' can be used not only for adjusting the closed position of the redundancy switching element A but also for adjusting intermediate positions, possibly in dependence upon application of a weaker current in cases in which the hydraulic cylinder Z' is actuated alone or additionally, so as to reduce the pilot pressure in the pilot line 18 for the pressure balance 5. It follows that the redundancy switching element fulfils the function of an electrically adjustable pressure limiting valve for adjusting the control pressure at the closing pilot side 20 of the pressure balance 5, e.g. for adjusting a lower supply pressure for the additional hydroconsumer Z'. A redundancy switching element A having this structural design could also be used for intentionally reducing the pilot pressure level for lifting and/or lowering control.

Function:

During lifting control the change-over valve 17 occupies its left position so that the pilot pressure from the pilot line 6 prevails in the pilot line 18. If the pressure control valve 3 should get stuck, although the proportional magnet 4 is de-excited, also the proportional magnet 15' will be de-excited so that the redundancy switching element A will abruptly move to its open position through the pilot pressure in the pilot line 18 and drain the pilot pressure towards the reservoir. The pressure balance 5 moves abruptly to its open position at which the pressure medium is directly drained towards the reservoir and the hydraulic cylinder Z discontinues its extension movement, the load pressure being held by a check valve downstream of the pressure control valve 3 and the pressure control valve 8. The proportional magnet 15' may then, however, only be de-excited according to a program routine by which it is detected that the hydraulic cylinder Z has not stopped properly.

During lowering control, the change-over valve 17 occupies the position shown so that the pressure of the pilot lines 12 and 12', respectively, prevails in the pilot line 18. If the pressure control valve 8 should get stuck, the pressure balance 10 will be moved to its closed position via the redundancy switching element A moving to its open position, as has been explained at the beginning, whereby the load pressure of the hydraulic cylinder Z will be held.

For adjusting a lower supply pressure in cases in which the hydroconsumer Z' is operated, the superordinate electronic control unit CU, which should expediently comprise a microprocessor or some other logic circuit, applies to the proportional magnet 15' a current which is just high enough for causing the pressure control valve 14' to move to an intermediate position and to drain part of the pressure medium from the pilot pressure line 18 towards the reservoir in a regulating fashion so as to reduce the pilot pressure at the closing pilot side 20 of the pressure balance 5 so that the pressure balance 20 will then relieve a comparatively larger amount of pressure medium towards the reservoir in order to reduce the supply pressure in the pressure line 1'.

In order to guarantee that, in the condition in which the redundancy switching element A occupies its open position, a very slow lowering movement of the hydraulic cylinder Z will not take place after discontinuance of the lowering control when the proportional pressure control valve 8 has got stuck, the redundancy switching element A provided in FIGS. 4 and 5 is a switching element which, in the de-excited condition of the switching magnet 15 or proportional magnet 15', shuts off the pilot line 12 towards the lowering branch 2 and relieves via a pilot line 12*b* the opening pilot side 19 of the pressure balance 10 directly towards the reservoir.

In FIG. 4, the redundancy switching element A is a 4/2-way switching valve 14" provided with a switching magnet 15 as an actuator against a spring 26. The redundancy switching element A is here not used for adjusting a lower supply pressure for additional hydroconsumers, but for protecting the flow regulators R1, R2 in the case of a malfunction and it may also be used for intentionally carrying out an arbitrary overruling switching action at the respective pressure balance for some other reason, e.g. for effecting an individual deceleration or for other safety reasons.

The 4/2-way switching valve 14" is a sliding valve provided with a valve slide member 27 which is pressure-compensated with respect to the reservoir pressure. The switching valve 14" is arranged between the two pilot lines 12 (extending from the lowering branch 2) and 6*a* (extending from the closing pilot side 20) of the pressure balance 5 and the change-over valve 16 (if provided) as well as the reservoir T and the pilot line 12*b* leading to the opening pilot side 19 of the pressure balance 10. In the de-excited condition of the switching magnet 15 (this can be a simple black-and-white magnet), the switching position shown in the figure exists, at which the pilot lines 12, 12*b* are separated from one another and the pilot lines 6*a* and 12*b* are both relieved towards the reservoir T via a bridging passage 24 in the valve slide member 27. In the excited condition of the switching magnet 15, a switching position is adjusted, at which the pilot line 6*a* is separated from the reservoir T and the pilot lines 12, 12*b* are interconnected.

If the proportional pressure control valve 8 should get stuck when the lowering control is discontinued, the opening pilot side 19 of the pressure balance 10 is relieved towards the reservoir Tat the switching position shown so that the pressure balance 10 will move to its closed position and hold the load. The hydraulic cylinder comes to a halt. The function in the case of lifting control corresponds to that explained with reference to FIG. 2.

A recovery lowering line 2*a* is indicated by the dot-and-dash line, said recovery lowering line 2*a* branching off from the lowering branch 2 between the proportional pressure control valve 8 and the pressure balance 10 and being connected to the suction side of the pump P. Between the connection of the recovery lowering line 2*a* and the reservoir, a check valve V is indicated, which blocks in the direction of the reservoir so that, during recovery lowering, the pressure medium from the hydraulic cylinder Z is pressed through the pump P which then operates as a motor driving the electric motor which then operates as a generator for recovering energy. The pressure medium will then flow via the pressure balance 20 to the reservoir, or, if additional hydroconsumers are connected and supplied, to a point beyond said reservoir. If a speed-controllable pump P is used, the pressure balance 10 will, during recovery lowering, adjust via the pump P the instantaneously required amount, if further hydroconsumers are additionally connected. The option of recovery lowering can easily be integrated in the case of each of the embodiments shown.

In FIG. 5 the redundancy switching element A is a 4/3 proportional pressure control valve 14'" provided with a proportional magnet 15' as an actuator of the valve slide member 27' against the force of a spring 26 and the pilot pressure in a pilot line 6*c* which branches off from the pilot line 6*a*. The additional connection corresponds to that which is shown in FIG. 4 and which has already been explained. The valve slide member 27' is pressure-compensated, expediently over the full area thereof, with respect to the reservoir pressure via the pilot line 25, whereas the pilot pressure of the pilot line 6*c* will, in an expedient manner, only act on a subarea of the area of the valve slide member 27 against the proportional magnet 15' so as to permit the use of a weak and compact proportional magnet 15' which is moderate in price.

For reducing the pilot pressure at the closing pilot side 20 of the pressure balance 5 during lifting control or during the control of additional hydroconsumers for the purpose of reducing the supply pressure of said hydroconsumers, e.g. the proportional magnet 15' has, in accordance with the desired pilot pressure in the pilot line 6*a*, applied thereto a weaker current than in cases in which the respective flow regulator is protected, so that the switching valve will assume regulating intermediate switching positions between end positions defined by respective marked overlaps. At the regulating intermediate switching positions the pilot lines 12, 12*b* are interconnected and also the pilot line 6*a* is directly connected to the reservoir.

What is claimed is:

1. An electrohydraulic lifting control device (S) for industrial trucks, comprising a lifting branch (1) provided between a pressure source (P) and a hydraulic cylinder (Z) and including a three-way flow regulator (R1), which is provided with a proportional magnet and a pressure balance (5) and which is adapted to be electrically operable at least for the purpose of lifting control, and further comprising a lowering branch (2) branching off from the lifting branch (1)

towards the reservoir and including, for the purpose of lowering control, an electrically operable two-way flow regulator (R2) provided with a proportional magnet and a pressure balance (10), characterized in that a redundancy switching element (A), which is actively electrically operable between closed and open positions, is provided between the pilot pressure circuit of the two-way flow regulator (R2) and/or the pilot pressure circuit of the three-way flow regulator (R1) and the reservoir (T).

2. An electrohydraulic lifting control device according to claim 1, characterized in that the redundancy switching element (A) is arranged between the reservoir (T) and an opening pilot side (19) of the pressure balance (10) of the two-way flow regulator (R2) and/or a closing pilot side (20) of the pressure balance (5) of the three-way flow regulator (R1).

3. An electrohydraulic lifting control device according to claim 1, characterized in that the redundancy switching element (A) is a 2/2-way control valve (14') with pilot pressure control (21) in the opening direction and with a proportional magnet (15') as an actuator for the closing direction.

4. An electrohydraulic lifting control device according to claim 1, characterized in that the redundancy switching element (A) is a 2/2-way control valve (14) with pilot pressure control (21) in the opening direction and with a black-and-white magnet (15') as an actuator for the closing direction.

5. An electrohydraulic lifting control device according to claim 3 or 4, characterized in that the pilot pressure control (21) of the redundancy switching element (A) is connected to the opening pilot side (19) of the pressure balance (10) of the two-way flow regulator (R2) or the closing pilot side (20) of the pressure balance (5) of the three-way flow regulator (R1).

6. An electrohydraulic lifting control device according to claim 5, characterized in that the pilot pressure control (21) of the redundancy switching element (A) is adapted to be connected via a change-over valve (17) to the opening pilot side (19) of the pressure balance (10) of the two-way flow regulator (R2) or the closing pilot side (20) of the pressure balance (5) of the three-way flow regulator (R1) in a pressure-dependent manner.

7. An electrohydraulic lifting control device according to claim 2, characterized in that the pressure balance (5) of the three-way flow regulator (R1) is additionally arranged for a load-independent control of at least one additional hydroconsumer (Z') fed by the same pressure source (P), and that the redundancy switching element (A) and the pressure balance (5) of the three-way regulator (R1) are adapted to be used for adjusting a supply pressure for said additional hydroconsumer (Z') which is at least lower than the supply pressure adjusted for the lifting control of the hydraulic cylinder (Z).

8. An electrohydraulic lifting control device according to claim 2, characterized in that the redundancy switching element (A) is a 4/2-way switching valve (14"), which is inserted between separate pilot lines (12, 6*a*) leading to the lowering branch (2) and the closing pilot side (20) of the pressure balance (5) of the three-way flow regulator (R1) as well as the reservoir (T) and a pilot line (12*b*) leading to the opening pilot side (19) of the pressure balance (10) of the two-way flow regulator (R2), and which is provided with a black-and-white magnet (15) as an actuator for a switching direction, and which, at one switching position, separates the pilot line (6*a*) from the reservoir (T) and connects the pilot lines (12, 12*b*) and, at another switching position, separates the pilot lines (12, 12*b*) and connects the pilot lines (6*a*, 12*b*) to the reservoir.

9. An electrohydrualic lifting control device according to claim 7, characterized in that the redundancy switching element is a 4/3-way proportional pressure control valve (14'), which is inserted between separate pilot lines (12, 6*a*) leading to the lowering branch (2) and to the closing pilot side (20) of the pressure balance (5) of the three-way flow regulator (R1) as well as the reservoir (T) and a pilot line (12*b*) leading to the opening pilot side (19) of the pressure balance (10) of the two-way flow regulator (R2), and which is provided with a proportional magnet (15') as an actuator for a switching direction against the force of a spring (26) and the pilot pressure in the pilot line (6*a*), and which, at one end switching position, separates the pilot line (6*a*) from the reservoir (T) and connects the pilot lines (12, 12*b*) and, at another end switching position, separates the pilot lines (12, 12*b*) and connects the pilot lines (6*a*, 12*b*) to the reservoir (T), and which, at intermediate switching positions located between said end switching positions for pilot pressure adjustment and variable by applying current to the proportional magnet in accordance with the pilot pressure in the pilot line (6*a*), interconnects the pilot lines (12, 12*b*) and connects the pilot line (6*a*) to the reservoir (T).

10. An electrohydraulic lifting control device according to claim 8 or 9, characterized in that the 4/2-way switching valve (14") or the 4/3-way proportional pressure control valve (14'") is a sliding valve whose leakproofness satisfies the requirements for industrial trucks.

11. An electrohydraulic lifting control device according to claim 8, characterized in that the 4/2-way switching valve (14'") comprises a valve slide member (27) which is pressure-compensated with respect to the reservoir (T) at both ends over a large area thereof.

12. An electrohydraulic lifting control device according to claim 9, characterized in that the 4/3-way proportional pressure control valve (14'") comprises a valve slide member (27') which is pressure-compensated with respect to the reservoir (T) at both ends over the full area thereof, only part of the area of said valve slide member (27) being acted upon by the pilot pressure in the pilot line (6*a*) against the proportional magnet (15').

13. An electrohydraulic lifting control device according to one of the claims 1 to 4, 6 to 9 and 12, characterized in that the pressure source (B) is provided with a speed-controllable pump having an electric motor (M) which is adapted to be operated via said pump as a generator for recovering energy in the case of lowering control, that a check valve (V) blocking towards the reservoir (T) is provided between said pump and said reservoir (T), and that a recovery lowering line (2*a*), which branches off from the lowering branch (2) at a point upstream of the pressure balance (10) of the two-way flow regulator (R2), is connected to said pump at a point downstream of said check valve (V).

14. An electrohydraulic lifting control device according to claim 13, characterized in that the electrically actively operable components (4, 9, 15, 15', M) of the lifting control device (S) are connected to an electronic control unit (SU) comprising a microprocessor or a logic circuit.

* * * * *